Sept. 8, 1953   R. A. BUTLER   2,651,427
MOBILE LIFTING AND LOWERING APPARATUS
Filed Oct. 17, 1950   2 Sheets-Sheet 2
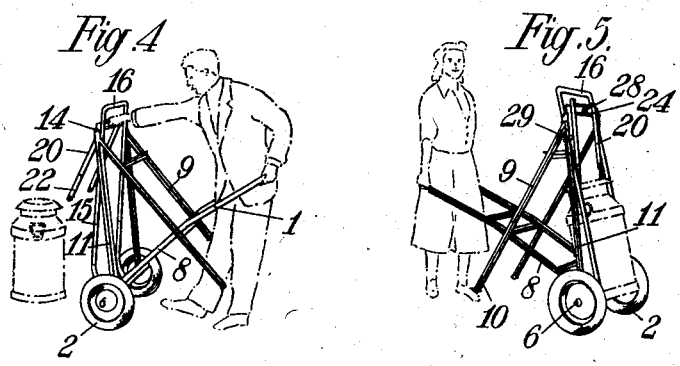
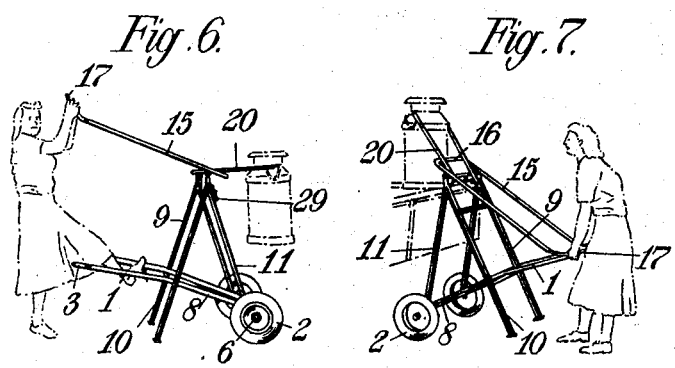
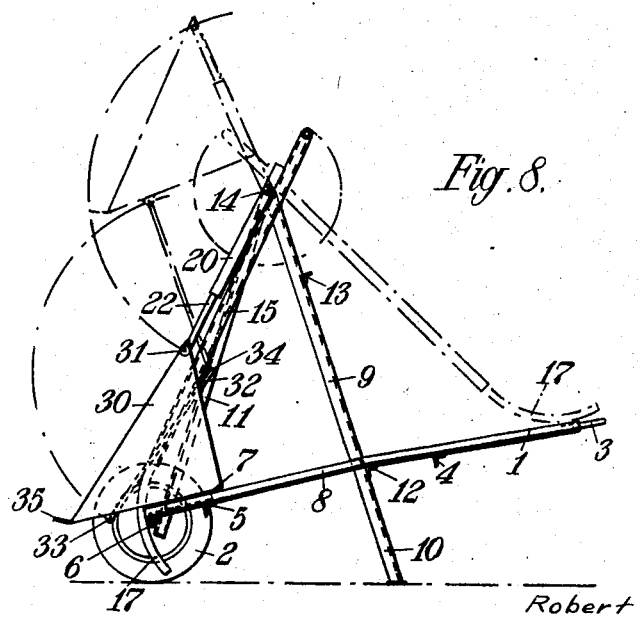
Inventor,
Robert A. Butler,
by Hall & Houghton
Attorneys.

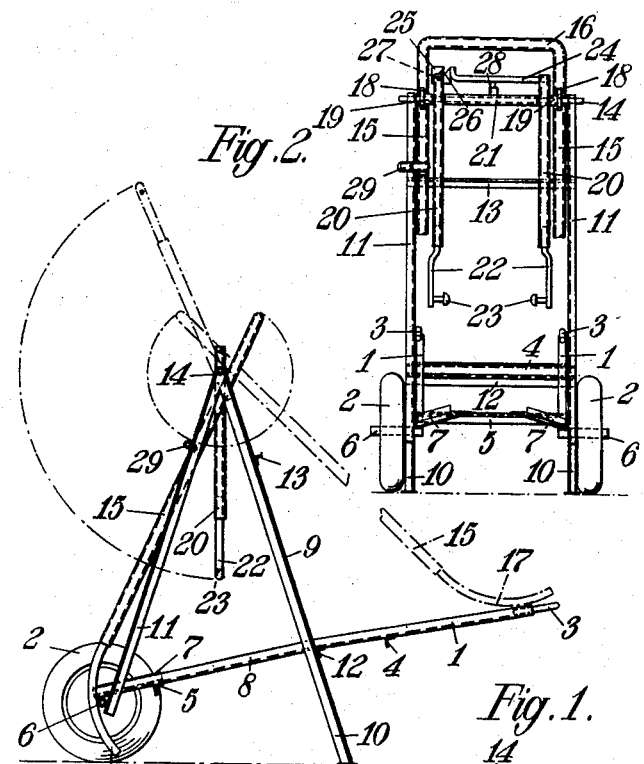
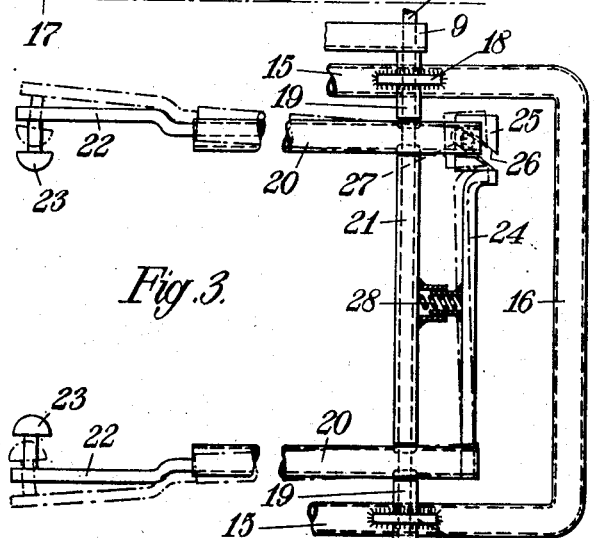

Patented Sept. 8, 1953

2,651,427

UNITED STATES PATENT OFFICE

2,651,427

MOBILE LIFTING AND LOWERING APPARATUS

Robert Alan Butler, Ashburton, England

Application October 17, 1950, Serial No. 190,591
In Great Britain October 29, 1949

7 Claims. (Cl. 214—377)

This invention relates to mobile lifting and lowering apparatus such as can be employed for placing loads on vehicles, although also capable of other uses. The main object of this invention is to provide improved apparatus of the above character adapted to be manually operated and of extremely simple and relatively inexpensive construction. A further object is to provide a mobile lifting and loading apparatus which is particularly suitable for agricultural purposes, as for example in the loading of milk churns and the like. A further object is to provide an apparatus having the above features which can readily be adapted for the lifting and loading of other articles such as filled sacks.

The invention consists in apparatus for the purposes described comprising a wheeled frame having lever means pivotally mounted thereon and arranged so that one end of such means can be directly attached to or engaged with a load resting upon the ground and so arranged that by swinging the lever means about its pivot the load can be lifted and also swung outwardly relative to the frame for placing upon a vehicle or other raised support.

The invention also consists in apparatus according to the preceding paragraph having handles for lifting and wheeling the frame in the manner of a wheelbarrow.

The invention also consists in an apparatus according to the preceding paragraph in which the pivoted lever means is provided with handles which when the lever means is swung to raise the load can be brought into proximity with the wheeling handles so that the two pairs of handles can be grasped together.

According to a further feature of the invention, the frame is formed to receive and support the load in an intermediate raised position in which it can be wheeled, such means preferably comprising cross bracing members of the frame structure and the arrangement being such that in said intermediate position the weight of the load acts within the frame support points to ensure stability.

According to a further feature of the invention, the pivoted lever means comprise primary and secondary levers arranged for interengagement during load lifting so that they then act as a single lever, and capable of being folded to an inoperative position to reduce the height of the apparatus. In a preferred arrangement, a secondary lever or levers are freely pivoted on the frame so that their ends can be brought into proximity to the handles of a churn or the like by tilting the frame forwardly on its wheels, said ends being formed to engage the churn handles, and a primary lever or levers are arranged to be swung about the same pivot axis to engage said secondary levers, the primary lever or levers being arranged to lie along the front portion of the frame when not in use. Preferably a catch is provided for holding the primary lever or levers in folded position when the frame is tilted forwardly as above described.

According to a further feature of the invention the pivoted lever means is formed for releasably engaging the handles of a churn or the like and having spring or like means for maintaining such engagement, enabling the lever to be detached from the handles when required. In a convenient arrangement according to the invention the secondary levers are loosely mounted on a pivot rod and their ends can be moved inwardly or outwardly by a spring loaded bar attached to the inner end of one lever and having a cam or like connection with the other lever.

In a preferred arrangement, the side elements of the apparatus frame are of triangular formation with two of the triangle sides extended to form the wheeling handles and supporting legs respectively, and the lever means is pivotally supported between the upper apices of the triangular frames.

According to a further feature of the invention, an attachment is provided in the form of a scoop or the like which can be secured to the lever means, or to the ends of the secondary levers, whereby sacks or like articles resting upon the ground can be lifted by the apparatus. In a preferred arrangement, a scoop or open sided box is pivotally connected to the churn engaging members of the secondary levers and a link connecting the scoop with the frame maintains the former in the required position during the lifting operation.

In the accompanying drawings,

Figure 1 is a side elevation of a mobile apparatus for lifting and lowering milk churns, constructed in accordance with the invention;

Figure 2 is an end elevation of the apparatus with the primary levers shown partly cut away;

Figure 3 is an end elevation, to an enlarged scale, of the secondary levers for engaging and lifting the churn;

Figures 4, 5, 6 and 7 are perspective views showing the different operations involved in the lifting, wheeling and loading of the churn;

Figure 8 is a side elevation with one side of the frame removed, showing a sack lifting attachment fitted thereto.

In carrying the invention into effect according to one convenient mode, as applied by way of example to an apparatus for loading milk churns on trailers or similar low platform vehicles, a wheeled frame is provided having handle members 1 which are inclined upwardly at a small angle to the horizontal and extend from a pair of laterally spaced supporting wheels 2 at the opposite end enabling the frame to be lifted and wheeled in the manner of a wheelbarrow. Handle grips 3 are fitted to the ends of the members 1 which are conveniently formed from angle iron. The members 1 are connected by cross braces 4 and 5 and the wheels are mounted on stub axles 6 secured to the said members. Inclined braces 7 are connected between the cross braces 5 and the respective members 1 near the points of attachment of the stub axles. Each side element of the frame comprises a triangle the slight inclined base 8 of which is extended on one side to form the wheeling handle. One side 9 of the triangular frame is extended downwardly at 10 intermediate the wheeling handle and the wheel 2 to form a supporting leg. The other side 11 of the triangular frame is connected to the base portion 8 near the point of attachment of the stub axles. The members 9 are connected by cross braces 12 and 13. The apices of the side frame members 9 and 11 are connected by a rod 14 forming a pivotal support for lifting lever means comprising primary and secondary levers arranged so that they can be interengaged to act as a single lever means for lifting purposes. A pair of primary levers 15 are formed from a single piece of tubular material having a connecting yoke 16 at one end and curved handles 17 at the opposite end. Brackets 18 welded or otherwise secured to the primary levers 15 are rotatable on the rod 14 and spacing collars 19 are provided. Secondary levers 20 have holes near their inner ends whereby they are pivotally mounted on the rod 14 and are held apart by a spacer tube 21. These levers are formed from lengths of tubular material to the ends of which are secured extension pieces 22 carrying inwardly extending headed pins 23. The holes in the levers 20 are of enlarged or slotted form so that the levers can rock laterally on the rod 14 as indicated by full and broken lines in Figure 3 and the pins 23 can thereby be brought into and out of engagement with the handles of a standard milk churn. A bar 24 attached to the inner end of one of the secondary levers 20 carries at its other end a plate 25 formed with an inclined slot 26 engaging a pin 27 secured to the inner end of the other secondary lever. A spring 28 interposed between the bar 24 and the spacer 21 maintains the secondary levers in the position shown in full lines. The churn engaging ends of the secondary levers can be separated by grasping the bar 24 near the plate 25, and upon release of the bar these levers will be returned by the spring 28. If desired this spring may be otherwise arranged, for example adjacent the plate 25. When not being operated, the secondary levers 20 hang vertically and the primary can be folded down to lie adjacent the front members 11 of the frame as shown in full lines in Figure 1. A pivoted or spring catch 29 on one of the frame members 11 holds the primary levers 15 in the position shown and prevents movement thereof when the frame is tilted forwardly on its wheels.

The arrangement is such that to engage and lift a milk churn resting on the ground, the apparatus is wheeled towards the churn and tilted forwardly as shown in Figure 4, the latch 29 preventing the primary levers 15 from moving outwardly. The apparatus is tilted by one hand holding one of the handle grips 3 and at the same time the other hand grasps the bar 24 and spacer 21, compressing the spring 28 and causing the ends of the secondary levers 20 to separate sufficiently to enable the pins 23 to pass over the churn handles. The bar 24 is then released so that the pins 23 enter within the churn handles and the wheeling handles 1 are then pressed downwardly causing the churn to be lifted from the ground upon the secondary levers. The length of these levers is such that the churn when lifted can rest upon the inclined braces 7 of the frame and is accommodated in a rearwardly inclined position for wheeling as shown in Figure 5. To raise the churn for loading purposes, the legs 10 are rested upon the ground and the primary levers are released from the latch 29 and swung rearwardly until the yoke 16 engages the rear of the secondary levers 20. One foot is then placed upon the cross brace 4 of the frame and the handles 17 of the primary levers are grasped and pulled downwardly so that the secondary levers together with the churn are raised as shown in Figure 6. It will be seen that in this position the engaged primary and secondary levers act in the manner of a single and slightly cranked lever, the lever ratio being sufficient to enable a standard ten gallon churn to be readily lifted when full. It is found that when the foot is removed from the cross brace 4 the weight of the operator greatly assists in the lifting operation. The primary levers 15 are pulled downwardly until the handles 17 are in close proximity to the wheeling handles and the two can be grasped together. This position is shown in broken lines in Figure 1. If desired, the respective handles can be formed with oppositely disposed semi-circular grips which are brought together when the primary levers are tilted as above described. The churn is now raised well above the ground and is also displaced forwardly of the wheel axles so that the churn can be deposited upon a trailer or other vehicle or the like by raising the lever and wheeling handles simultaneously so as to lower the churn to the desired extent as shown in Figure 7. The handles can then be released so that the churn rests on the platform and its weight is taken off the pins 23. The bar 24 is then operated as previously described to separate the outer ends of the secondary levers 20 and disconnect them from the churn so that the apparatus can be moved away. The primary levers 15 are then returned to the front of the frame and secured by the catch 29 ready for the next operation.

It will be seen that when the churn is in the intermediate or wheeling position as shown in Figure 5, the weight acts within the points of frame support, whilst during the initial lifting of the churn from the ground and also during the final lifting and loading operation the wheeling handles, and in the latter operation the lifting handles, are under the full control of the user, and stability is thereby ensured.

In order to enable filled sacks or like articles to be lifted and loaded, the apparatus is provided with an attachment as shown in Figure 8. The attachment comprises a scoop or open sided box structure 30 the sides of which are of generally triangular shape. Holes 31 are provided at the upper corners of the sides and these holes are of enlarged or slotted form so that the headed pins 23 of the secondary levers can enter therein and support the scoop, the width of the later being such that the pins will enter these holes under the action of the loading spring 28. The scoop or box is proportioned so that when so suspended it will rest upon the cross braces 5 and 7 as shown in Figure 8. A link 32 has one end pivotally connected to the lower part of the scoop at 33 and its other end is pivotally connected to one of the frame elements 11 at 34. This latter pivotal connection is made by a bolt and nut to a suitable hole in the frame element so that it can be disconnected when required. The length of the link 34 is the same as that of the secondary levers 20 so that when the latter are raised as shown by the broken lines in Figure 8, the lower part of the scoop will maintain the same relation or angle with respect to its upper point of support and will not be tilted. The base of the scoop is provided with an upwardly inclined lip 35 to prevent sacks or the like from sliding off when the apparatus is wheeled. The arrangement is such that to pick up a sack the apparatus is tilted forward on its wheels until the sack can be engaged by the forward lip of the scoop in the manner of a conventional sack truck. The primary levers 15 are then operated in the manner previously described to engage and lift the secondary levers 20 and thereby raise the sack in the scoop 30. The apparatus can then be wheeled and the sack finally deposited in the position required, e. g. on a truck or raised support, by releasing the primary levers.

It will be understood that the invention is not restricted to the example described, since details of structure can be widely varied and the apparatus can be adapted for the lifting of other articles than those described, and the height of lift and the loads which can conveniently be lifted are capable of wide variation by suitably changing the dimensions. Also other means may be employed for attaching the load to the lifting levers and by suitable modification or duplication of the levers the invention may be applied to the lifting and handling of two or more churns or other articles simultaneously.

I claim:

1. Apparatus for lifting and loading comprising, in combination, a wheeled frame having wheeling handles, lever means freely pivoted on said frame and capable of extending substantially vertically downwards and having attachment means for connection to a load, said lever means being arranged and dimensioned so that it can be attached to a load resting on the ground while in a substantially vertical position, lever handle means operable about the same pivot as said lever means to swing the latter relative to the frame with a mechanical advantage to raise the load while simultaneously displacing it outwardly relatively to the frame to a raised position from which it can be lowered to rest directly upon a receiving support such as vehicle at a substantial height above the ground, the said lever means and lever handle means comprising primary and secondary levers respectively which are arranged so that they are interengaged during load lifting and thereby act as a single lever and are capable of being folded to an inoperative position to reduce the height of the complete apparatus, and means for securing the load in an intermediate position slightly raised above the ground in which position the load can be wheeled without requiring operation of said lever handle means.

2. Apparatus for lifting and loading comprising, in combination, a wheelbarrow type of frame having wheeling handles, secondary levers freely pivoted on the frame and capable of extending substantially vertically downwards and having attachment means which can be connected to the handles of a load such as a milk churn by tilting the frame on its wheels while the load is resting on the ground and the said levers are in a substantially vertical position, primary levers constituting lever handles pivotable about the same axis as the secondary levers and arranged to operatively engage the latter when swung about the said axis and to swing said secondary levers relative to the frame with a mechanical advantage to raise the load while simultaneously displacing it outwardly relatively to the frame to a raised position from which it can be lowered to rest directly upon a receiving support such as a vehicle at a substantial height above the ground, the said primary levers being arranged so that they can lie along the front portion of the frame when not in use, catch means for holding said primary levers in out of use position, and means for securing the load in an intermediate position slightly raised above the ground in which position the load can be wheeled without requiring operation of the lever handle means.

3. Apparatus for lifting and loading comprising, in combination, a wheelbarrow type of frame having wheeling handles, secondary levers freely pivoted on the frame and capable of extending substantially vertically downwards and having attachment means which can be connected to the handles of a load such as a milk churn by tilting the frame on its wheels while the load is resting on the ground and the said levers are in a substantially vertical position, primary levers constituting lever handles pivotable about the same axis as the secondary levers, said primary levers lying outside the secondary levers and arranged to swing the latter relative to the frame with a mechanical advantage to raise the load while simultaneously displacing it outwardly relatively to the frame to a raised position from which it can be lowered to rest directly upon a receiving support such as a vehicle at a substantial height from the ground, extensions of said primary levers beyond the pivotal axis thereof, a yoke connecting said extensions and arranged to engage and raise the secondary levers when the primary levers are swung about their pivots for lifting purposes, and means for securing the load in an intermediate position slightly raised above the ground in which position the load can be wheeled without requiring operation of the lever handle means.

4. Apparatus for lifting and loading comprising, in combination, a wheeled frame having wheeling handles, secondary levers loosely mounted on a pivot rod and capable of extending substantially vertically downwards, formations on the ends of said levers for releasably engaging handles of a milk churn resting on the ground while the said levers are in a substantially vertical position, the pivoted ends of said levers being extended beyond their pivot axis, a spring loaded bar attached to said extended end of one of the levers and having an inclined sliding connection with the corresponding end of the other lever whereby the opposite ends of the levers are held in churn handle engaging position by the spring loading and may be released by operating the bar to separate the ends engaged thereby, lever handle means operable about the same pivot as said secondary levers to swing the latter relative to the frame with a mechanical advantage to raise the churn while simultaneously displacing it outwardly relatively to the frame to a raised position from which it can be lowered to rest directly upon a receiving support such as a vehicle at a substantial height above the ground, and means for securing the churn in an intermediate position slightly raised above the ground in which position the churn can be wheeled without requiring operation of said lever handle means.

5. Apparatus for lifting and loading comprising, in combination, a wheeled frame having wheeling handles, secondary levers loosely mounted on a pivot rod, inwardly extending headed pins on the outer ends of said secondary levers adapted for engagement beneath milk churn handles while the churn is resting on the ground and the said levers are in a substantially vertical position, the pivoted ends of the said levers being extended beyond their pivot axis, a spring loaded bar attached to said extended end of one of the levers and having an inclined sliding connection with the corresponding end of the other lever whereby the opposite ends of the levers are held in churn handle engaging position by the spring loading and may be released by operating the bar to separate the ends engaged thereby, lever handle means operable about the same pivot as the secondary levers to swing the latter relative to the frame with a mechanical advantage to raise the churn while simultaneously displacing it outwardly relatively to the frame to a raised position from which it can be lowered to rest directly upon a receiving support such as a vehicle at a substantial height from the ground, and means for securing the churn in an intermediate position slightly raised above the ground in which position the churn can be wheeled without requiring operation of said lever handle means.

6. Apparatus for lifting and loading comprising, in combination, a wheeled frame having wheeling handles, secondary levers loosely mounted on a pivot rod, inwardly directed headed members at the ends of said levers adapted for engagement beneath the handles of a milk churn constituting a load while the churn is resting on the ground and the said levers are in a substantially vertical position, a scoop-like attachment for containing a load having enlarged holes into which the headed members of the secondary levers can enter so that the scoop-like attachment is pivotally suspended therefrom, link means connecting the attachment with a point on the frame for maintaining the angular relation of said attachment with the ground substantially constant during lifting, lever handle means operable about the same pivot as the secondary levers to swing the latter relatively to the frame with a mechanical advantage to raise the load while simultaneously displacing it outwardly relatively to the frame to a raised position from which it can be lowered to rest directly upon a receiving support such as a vehicle at a substantial height above the ground, and means for securing the load in an intermediate position slightly raised above the ground in which position the load can be wheeled without requiring operation of said lever handle means.

7. Apparatus for lifting and loading comprising, in combination, a frame of the wheelbarrow type capable of being tilted on its wheels, lever means freely pivoted on said frame and capable of extending substantially vertically downwards and having attachment means for connection to a load, said lever means being arranged and dimensioned so that it can be attached to a load resting on the ground while in a substantially vertical position, a scoop-like attachment having means whereby it may be releasably secured to the lever means to enable articles such as sacks resting on the ground to be engaged by such attachment by tilting the frame on its wheels, lever handle means operable about the same pivot as said lever means to swing the latter relative to the frame with a mechanical advantage to raise the load while simultaneously displacing it outwardly relatively to the frame to a raised position from which it can be lowered to rest directly upon a receiving support such as a vehicle at a substantial height above the ground, means for securing the load in an intermediate position slightly raised above the ground in which position the load can be wheeled without requiring operation of said lever handle means, and link means connecting the attachment with a point on the frame for maintaining the angular relation of said attachment with the ground substantially constant during lifting.

ROBERT ALAN BUTLER.

References Cited in the file of this patent

UNITED STATES PATENTS

| Number | Name | Date |
| --- | --- | --- |
| 1,000,102 | McCoy | Aug. 8, 1911 |
| 1,530,014 | Sarff | Mar. 17, 1925 |
| 2,240,723 | Stoehr | May 6, 1941 |
| 2,362,749 | Gall et al. | Nov. 14, 1944 |
| 2,424,852 | Rush et al. | July 29, 1947 |

FOREIGN PATENTS

| Number | Country | Date |
| --- | --- | --- |
| 13,656 | Australia | June 5, 1928 |
| 638,432 | France | Feb. 21, 1928 |